United States Patent [19]
Jones

[11] 3,890,737
[45] June 24, 1975

[54] FISH HOOK RECEPTACLE

[76] Inventor: Boyd C. Jones, 750 Brahams Way, Sunnyvale, Calif. 94087

[22] Filed: Mar. 25, 1974

[21] Appl. No.: 454,325

[52] U.S. Cl.................................... 43/57.5 R
[51] Int. Cl............................... A01k 97/06
[58] Field of Search..................... 43/57.5, 54.5

[56] References Cited
UNITED STATES PATENTS
2,716,302   8/1955   Dutton........................... 43/57.5 R
3,126,662   3/1964   White............................ 43/57.5 R

*Primary Examiner*—Warner H. Camp
*Attorney, Agent, or Firm*—Paul B. Fihe

[57] ABSTRACT

A fish hook receptacle including an elongated tubular member slotted to receive the hook portion of a fish hook and having a plurality of parallel, outwardly-projecting flanges at spaced intervals mounting resilient holding means for releasably engaging the leader portions of the fish hooks.

4 Claims, 3 Drawing Figures

PATENTED JUN 24 1975

3,890,737

(3,890,737)

FISH HOOK RECEPTACLE

FIELD OF THE INVENTION

The present invention relates generally to fishing tackle, and more particularly, to a fish hook receptacle enabling the simplified mounting of a plurality of fish hooks and their associated leaders.

BACKGROUND OF THE INVENTION

Fishermen normally carry in their tackle boxes a plurality of fish hooks with attached leaders which can be selected by each fisherman for the particular type of fish. However, the barbed ends of the hooks become tangled with portions of the leaders and other hooks and leaders in the tackle box and considerable problems have been encountered in disentangling an individual fish hook and associated leader.

In an effort to solve this problem, certain receptacles or devices have been provided but have presented problems in either the engagement or disengagement of the individual hook and associated leader or, alternatively, have still left exposed the barbed ends of the hooks which can fasten themselves inadvertently to other lines, other fishing tackle or even to fingers of fishermen reaching into the tackle box.

SUMMARY OF THE PRESENT INVENTION

It is the general objective of the present invention to provide a very simple fish hook receptacle which is quite inexpensive and yet is capable of separately supporting a plurality of fish hooks and associated leaders in a manner which enables the ready attachment of an individual fish hook to such receptacle and the equally ready disengagement when the particular fish hook and leader is to be used. Such objective is achieved, preferably, by a simple integral plastic structure including a central tubular member which is slotted longitudinally at intervals so as to be capable of receiving within each slot the barbed end of the fish hook, the interior of the tubular member being of sufficient dimensions to receive hooks ranging in size from very small to any desired larger size depending upon the particular fish being sought by the fisherman.

At spaced intervals on the tubular member, a plurality of simple flanges project outwardly in substantial parallelism so as to function as partitions to separate the individual fish hooks and leaders along the length of the supporting tubular member.

On opposite sides of each of the flanges, resilient holding means, preferably in the form of an outwardly-projecting resilient metal strip, is provided to frictionally but releasably hold the extremity of a leader which is wound around the tubular member after the fish hook itself has been inserted in the previously described slot. The leader is readily attached as well as the fish hook and it is accessible at the outer perimeter of the receptacle so as to be readily grasped for unwinding and disengagement of the hook from the slot when the particular fish hook is to be utilized.

It is to be particularly observed that the barbed end of the fish hook is located interiorly of the tubular member so that it cannot possibly catch on any other tackle or accidentally come into engagement with the fisherman's finger. The leader is also within the outer contour of the receptacle so that it cannot be inadvertently disengaged.

BRIEF DESCRIPTION OF THE DRAWING

The stated objective of the invention and the manner in which it is achieved, as summarized hereinabove, will be more readily understood by reference to the following detailed description of the exemplary structure shown in the accompanying drawing wherein.

DETAILED DESCRIPTION OF THE EXEMPLARY EMBODIMENT OF THE INVENTION

Figure 1:
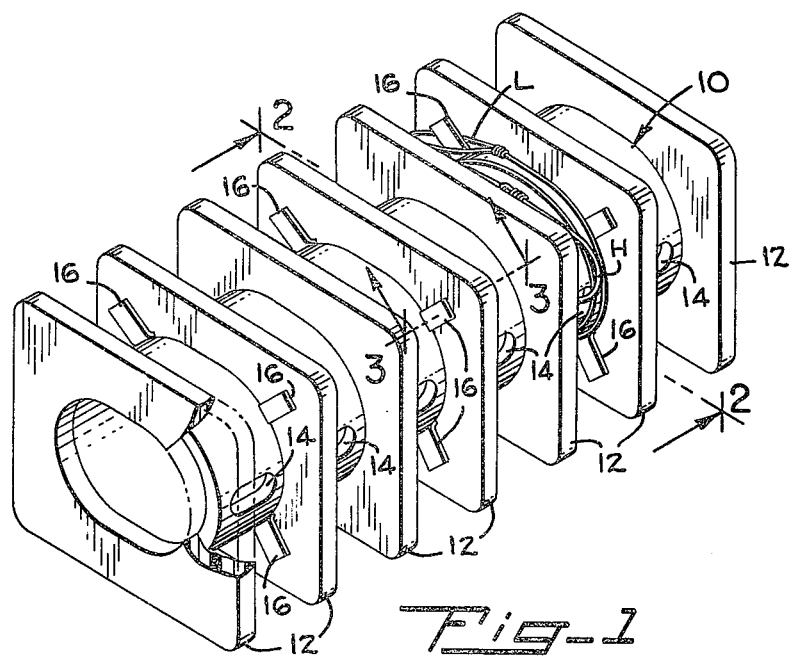
FIG. 1 is a perspective view of a fish hook receptacle embodying the present invention which is capable of supporting a plurality of fish hooks, one fish hook being illustrated in supported relationship thereon.

With initial reference to FIG. 1, the illustrated embodiment of the invention includes an elongated tubular member 10 of generally oval cross-section to which is joined at longitudinally spaced intervals a plurality of outwardly-projecting and preferably rectangular perimeter flanges 12 which function as separating partitions for six hook holding sections of the tubular member. In order to hold the barbed end of a hook H, each of the sections of the tubular member 10 separated by the flanges 12 is provided with a slot 14, preferably at the elongated end of the oval tubular member, so that, as can be seen best by reference to FIG. 2, the barbed end of a fish hook H of rather large dimensions can be readily received without unnecessarily enlarging the dimensions of the entire unit.

Figure 2:
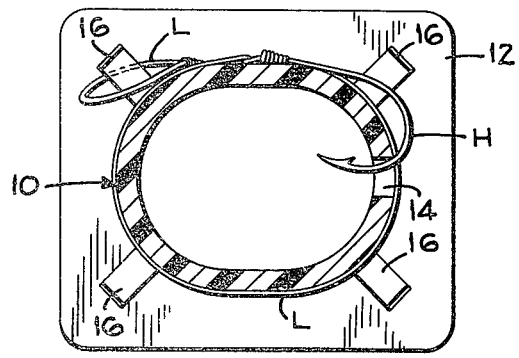
FIG. 2 is a transverse sectional view taken along line 2—2 of FIG. 1.
Figure 3:
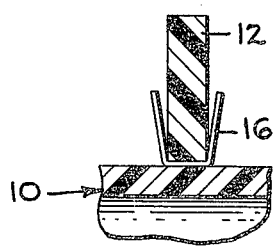
FIG. 3 is another fragmentary sectional view taken along line 3—3 of FIG. 1.

After the barbed end of the hook H is manually inserted into one of the slots 14 in a position best shown in FIG. 2, the leader L can be simply wrapped around the tubular member so as to be individually confined between two of the flanges 12. In order to releasably hold the end of the leader, a plurality of U-shaped resilient metal strips 16, one of which is shown most clearly in FIG. 3, are mounted on the individual flanges 12 so that the base portion of each U-shaped member extends through the interior of the flange and the side portions of the U-shaped resilient strip extend upwardly on opposite sides of the flange, preferably having a slight divergence from the surface of the flange to facilitate the manual insertion of the end of the leader L which is consequently resiliently gripped to normally be held but be, in turn, manually available for easy withdrawal when a fish hook is to be removed from the receptacle. After the leader L has been loosened from the frictional grip, it can be quickly unwound and the fish hook H itself withdrawn from the slot so that it is very quickly available for use.

Preferably, the entire unit, as illustrated in FIG. 1, can be formed in an injection mold although it is indeed possible that tubular sections and individual flanges can be individually formed and then secured together to make a receptacle of any desired capacity.

The flanges 12 obviously keep the hooks H and associated leaders L in adjacent sections separated so that no entanglement will occur and so that ease of access to an individual leader and hook is facilitated. The hook portion, of course, is confined within the tubular member 10 so as to be enclosed against inadvertent and undesired hooked contact with any other piece of tackle and while the end of the leader L is also held within the exterior contour of the receptacle, it is close to the perimeter so as to be immediately available for manual access when the particular fish hook and leader is to be withdrawn and utilized.

It will be apparent that many modifications and/or alterations in the specifically described structure can be made without departing from the spirit of the invention and, accordingly, the foregoing description is to be considered as purely exemplary and not in a limiting sense and the scope of the invention is to be indicated only by reference to the appended claims.

What is claimed is:

1. A fish hook receptacle which comprises
   a tubular member having a slot therein to accommodate the hook portion of the fish hook,
   a flange projecting outwardly from said tubular member, and resilient means on the side of said flange for releasably receiving and holding the leader portion of said fish hook.

2. A fish hook receptacle according to claim 1 wherein
   said leader receiving means includes a U-shaped resilient strip extending through said flange at its base portion with its side portions extending outwardly adjacent opposite surfaces of said flange.

3. A fish hook receptacle according to claim 1 which comprises
   a plurality of said flanges joined to said tubular member at spaced positions.

4. A fish hook receptacle according to claim 3 wherein
   said tubular member and said flanges are formed integrally of plastic material.

* * * * *